(12) United States Patent
Tsuchida et al.

(10) Patent No.: US 10,763,570 B2
(45) Date of Patent: Sep. 1, 2020

(54) ANTENNA APPARATUS

(71) Applicant: TOSHIBA TEC KABUSHIKI KAISHA, Tokyo (JP)

(72) Inventors: Sunao Tsuchida, Mishima Shizuoka (JP); Sadatoshi Oishi, Fuji Shizuoka (JP); Jun Yaginuma, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 515 days.

(21) Appl. No.: 15/622,982

(22) Filed: Jun. 14, 2017

(65) Prior Publication Data

US 2017/0373373 A1  Dec. 28, 2017

(30) Foreign Application Priority Data

Jun. 24, 2016 (JP) ................................. 2016-125078

(51) Int. Cl.
*H01Q 1/22* (2006.01)
*H01Q 9/04* (2006.01)
*H01Q 1/48* (2006.01)
*G06K 7/10* (2006.01)
*G06K 7/00* (2006.01)
(Continued)

(52) U.S. Cl.
CPC ......... *H01Q 1/2216* (2013.01); *G06K 7/0004* (2013.01); *G06K 7/10009* (2013.01); *G06K 7/1097* (2013.01); *G06K 7/10316* (2013.01); *G06K 7/10356* (2013.01); *G06K 7/10722* (2013.01); *H01Q 1/48* (2013.01);
(Continued)

(58) Field of Classification Search
CPC .................... G06K 7/10326–10346; G06K 7/10316–10356; G06K 7/10; G06K 7/0004; G06K 7/1097; H01Q 1/2208–2216; H01Q 1/48; H01Q 9/0421; H01Q 13/0266; H01Q 1/2216
See application file for complete search history.

(56) References Cited

U.S. PATENT DOCUMENTS 5,382,784 A    1/1995 Eberhardt
9,608,327 B1 *  3/2017 Tai ........................... H01Q 7/06
(Continued)

FOREIGN PATENT DOCUMENTS

CN    102948015 A    2/2013
GB      2520876 A    6/2015
(Continued)

OTHER PUBLICATIONS

Extended European Search Report dated Nov. 30, 2017, filed in counterpart European Patent Application No. 17177654.5 (9 pages).
(Continued)

*Primary Examiner* — Ricardo I Magallanes
(74) *Attorney, Agent, or Firm* — Kim & Stewart LLP

(57) ABSTRACT

According to one embodiment, an antenna apparatus includes a ground plate having an opening, a ground layer on a first side of the ground plate, an antenna on the first side of the ground plate and connected to the ground layer, the antenna being disposed around the opening, and a conductive member on the first side of the ground plate to contact an outer perimeter of the opening. The conductive member is electrically connected to the ground layer.

18 Claims, 5 Drawing Sheets

(51) Int. Cl.
*H01Q 21/06* (2006.01)
*H01Q 7/00* (2006.01)

(52) U.S. Cl.
CPC ............. *H01Q 7/00* (2013.01); *H01Q 9/0421* (2013.01); *H01Q 9/0464* (2013.01); *H01Q 21/061* (2013.01)

(56) References Cited

U.S. PATENT DOCUMENTS

| | | | | |
|---|---|---|---|---|
| 2015/0180126 A1* | 6/2015 | Nakano | ............... | G06K 7/10009 343/788 |
| 2015/0269400 A1* | 9/2015 | Poussot | .............. | G06K 7/10346 340/10.1 |
| 2016/0276744 A1* | 9/2016 | Manzi | ................ | G06K 7/10366 |

FOREIGN PATENT DOCUMENTS

| | | |
|---|---|---|
| JP | 2002-329177 | 11/2002 |
| JP | 2014-027418 | 2/2014 |
| WO | 2014/057464 A1 | 4/2014 |
| WO | 2015/030335 A1 | 3/2015 |

OTHER PUBLICATIONS

T.J. Cho et al., "Front-to-Back Ratio Improvement of a Microstrip Patch antenna by Ground Plane Edge Shaping", Antennas and Propagation Society International Symposium (APSURSI), 2010 IEEE, IEEE, Piscataway, NJ, USA, Jul. 11, 2010 (Jul. 11, 2010), pp. 1-4.

First Office Action dated Apr. 2, 2019 in corresponding Chinese Patent Application No. 201710436757.9 with English translation, 14 pages.

* cited by examiner

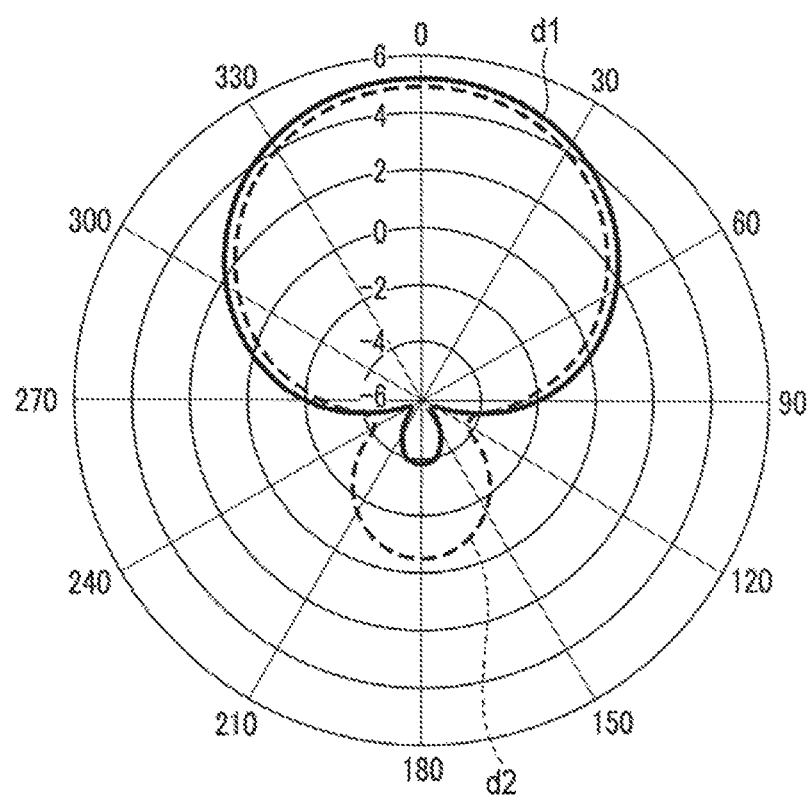

1

ANTENNA APPARATUS

CROSS-REFERENCE TO RELATED APPLICATION

This application is based upon and claims the benefit of priority from Japanese Patent Application No. 2016-125078, filed Jun. 24, 2016, the entire contents of which are incorporated herein by reference.

FIELD

Embodiments described herein relate generally to an antenna apparatus.

BACKGROUND

There is a system that performs merchandise registration or inventory management using a code symbol, such as a bar code, or other two-dimensional code, attached to merchandise. This system type uses an optical reader for optically reading a code symbol.

There is also a system that performs merchandise registration or inventory management using a wireless tag that is attached to merchandise. This system type uses a wireless tag reader for wirelessly reading information of a wireless tag.

In addition, there is also a system that performs merchandise registration or inventory management using both a code symbol and a wireless tag. However, with this system type, when code symbols are attached only to some articles of merchandise and wireless tags are attached only to some other articles of merchandise, an operator needs to change between using an optical reader and the wireless tag reader. For example, with respect to the merchandise to which the code symbol is attached, the operator must hold the code symbol in front of the optical reader. With respect to the merchandise on which the wireless tag is attached, the operator moves the wireless tag to within a reading range of the wireless tag reader to read the wireless tag.

Switching between an optical reader and a wireless tag reader can be troublesome. Therefore, a wireless tag reader including an antenna apparatus which does not hinder reading of the code symbol by an optical reader has been devised.

An example thereof is an antenna apparatus with a rectangular opening provided at a central portion of a substrate. On the substrate, four elements of an antenna are disposed in a rectangular shape. An optical reader can read a code symbol through the opening. With such a structure, the antenna does not hinder the functioning of the optical reader.

BRIEF DESCRIPTION OF THE DRAWINGS

FIG. 5A is a perspective view of one radiation element; FIG. 5B is a plan view of the one radiation element; and FIG. 5C is a cross-sectional view taken along the line VC-VC in FIG. 5B.

FIGS. 6A and 6B show characteristics of the antenna apparatus according to the first embodiment; FIG. 6A is a characteristic diagram showing directivity calculated by electromagnetic field simulation; and FIG. 6B is a diagram showing an FB ratio.

DETAILED DESCRIPTION

In an antenna apparatus with a rectangular opening, as described above, the opening is grounded, and thus a front-to-back ratio (FB ratio) is deteriorated. That is, radiation of radio waves by the antenna in a backward direction is stronger and it is thus susceptible to influence from unwanted sources in the back of the antenna.

Therefore, an exemplary embodiment provides an antenna apparatus for reading information of a wireless tag which suppresses radiation of radio waves by the antenna in a backward direction without hindering light passing through in a reading range of an optical reader or the like.

In general, according to one embodiment, an antenna apparatus includes a ground plate having an opening, a ground layer on a first side of the ground plate, an antenna on the first side of the ground plate and connected to the ground layer, the antenna being disposed around the opening, and a conductive member on the first side of the ground plate to contact an outer perimeter of the opening. The conductive member is electrically connected to the ground plate.

Figure 1:
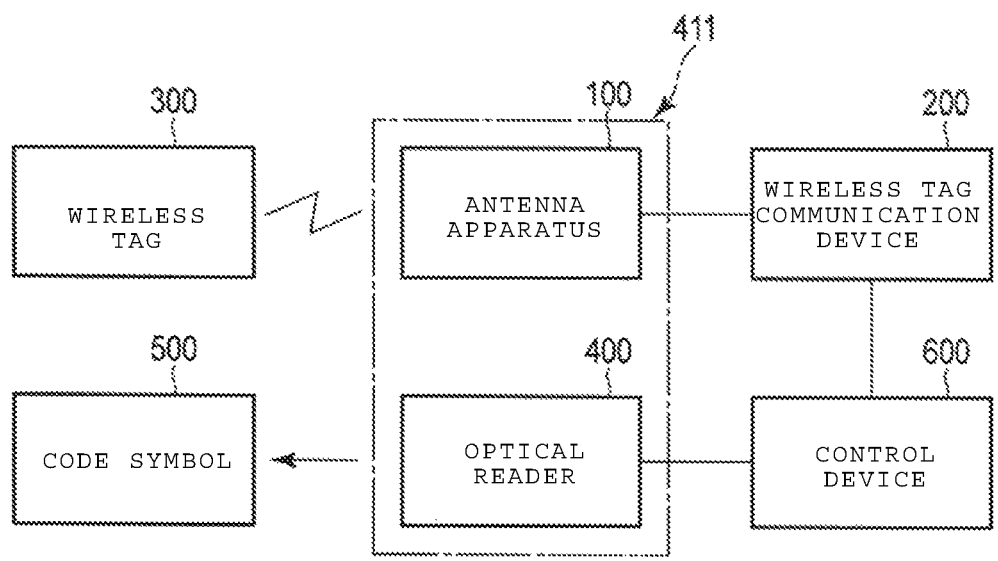
FIG. 1 is a diagram showing aspects of an antenna apparatus according to a first embodiment.
Figure 2:
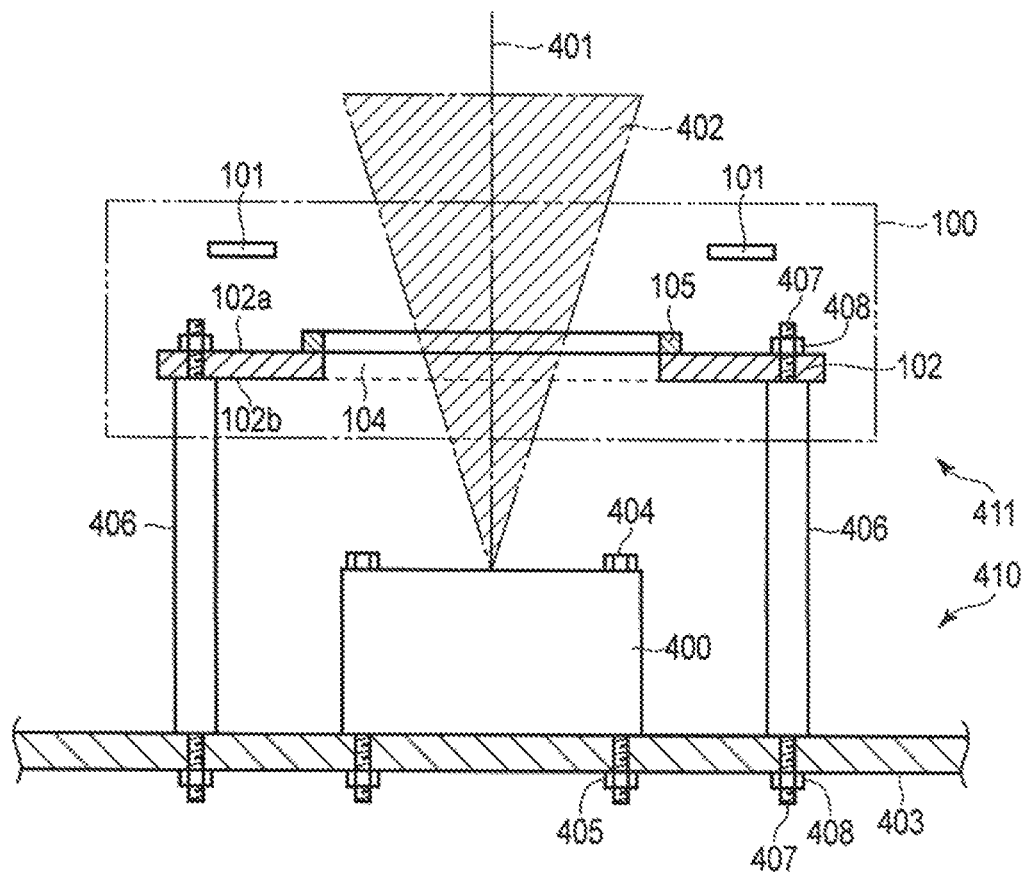
FIG. 2 is a cross-sectional view showing an assembled state of the antenna apparatus and an optical reader according to the first embodiment.

Hereinafter, a first embodiment will be described with reference to FIG. 1 to FIG. 6. FIG. 1 is a diagram showing aspects of an antenna apparatus 100 according to a first embodiment. FIG. 2 is a cross-sectional view showing an assembled state of the antenna apparatus 100 and an optical reader 400 according to the first embodiment.

As described in FIG. 1, the antenna apparatus 100 according to the embodiment is connected to a wireless tag communication device (wireless tag reader) 200. The wireless tag communication device 200 and an optical reader 400 are both connected to a control device 600. The wireless tag communication device 200 reads information stored in a wireless tag 300 by wireless communication through the antenna apparatus 100, and transmits the read information to the control device 600. The wireless tag 300 is also called as an IC tag or a radio frequency identification tag (RFID). The optical reader 400 optically reads information of a code symbol 500 such as a bar code or a QR code®, and transmits the information that has been read to the control device 600. In addition, the control device 600 transmits an instruction such as a start of reading of the wireless tag communication device 200 or the optical reader 400, and performs reading of the wireless tag 300 by the wireless tag communication device 200 and reading of the code symbol 500 by the optical reader 400.

According to the embodiment, the antenna apparatus 100 is to be used in a wireless tag communication device 200 that is combined with an optical reader 400 to provide a dual-type (optical code/wireless tag) reader system.

Figure 3:
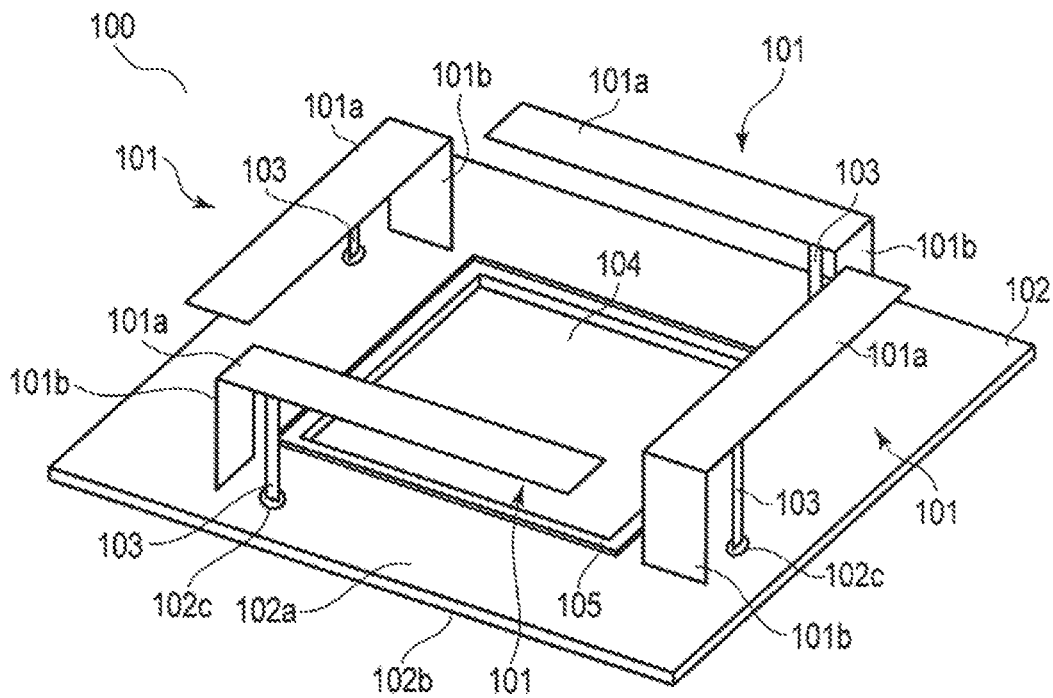
FIG. 3 is a perspective view of the antenna apparatus according to the first embodiment.
Figure 4:
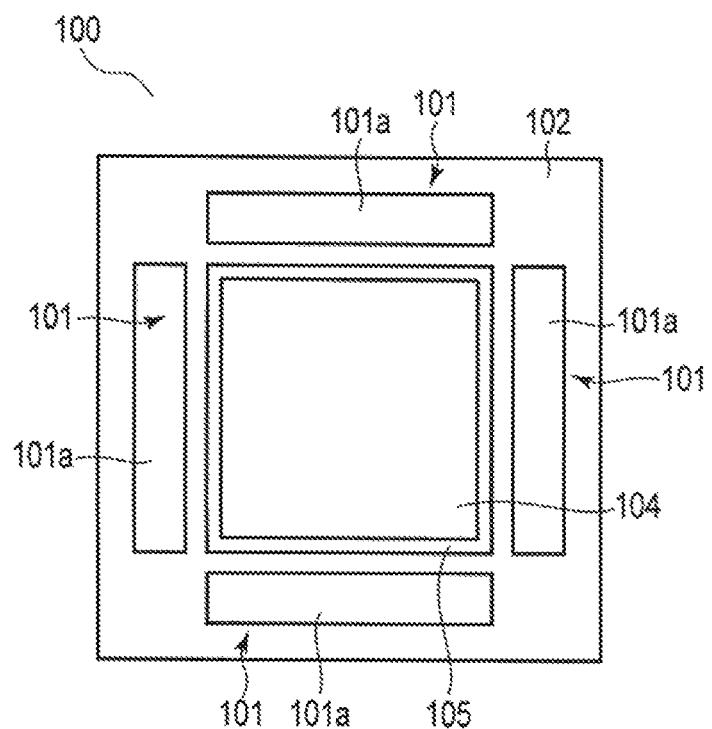
FIG. 4 is a plan view of the antenna apparatus according to the first embodiment.

Next, the antenna apparatus 100 will be described in detail with reference to FIG. 2 to FIG. 4. A perspective view of the antenna apparatus 100 is shown in FIG. 3. A plan view of the antenna apparatus 100 is shown in FIG. 4. The antenna apparatus 100 includes a substrate 102 that is a ground plate, a plurality of radiation elements 101 (four elements in this embodiment), and a conductive member 105. For example, the substrate 102 is a rectangular substrate comprised of resin or ceramic. The substrate 102 includes a first plate surface 102a on a front surface side and a second plate surface 102b on a rear surface side. A rectangular shape opening 104 is provided in a centrally disposed portion (central portion) of the substrate 102.

The four radiation elements 101 are disposed around the opening 104 on the first plate surface 102a of the substrate 102. As shown in FIG. 3, the four radiation elements 101 are disposed so as not to block the opening 104. Approximately the entire region of the first plate surface 102a of the substrate 102 is a conductive layer (also referred to as "aground layer") whose voltage is set to a ground level. A power supply unit (not shown) for supplying power to the radiation elements 101 is disposed on the second plate surface 102b of the substrate 102.

Figure 5A:
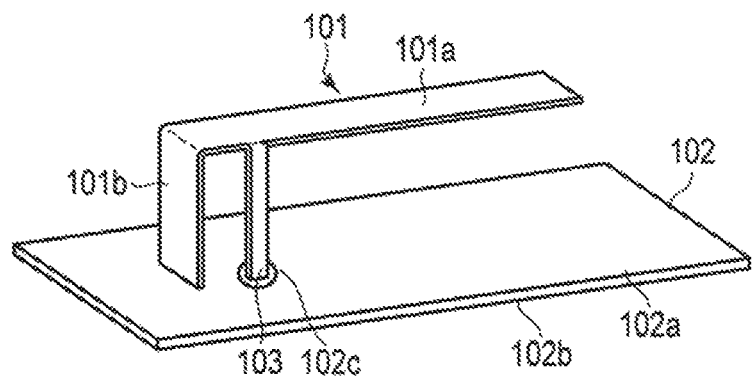
FIGS. 5A, 5B, and 5C show one radiation element structure of the antenna apparatus according to the first embodiment.
Figure 5B:
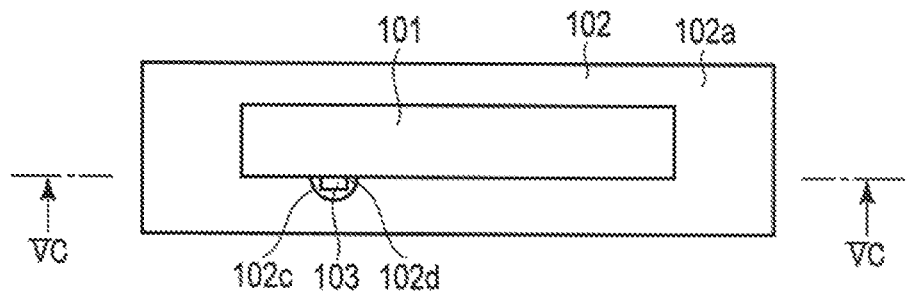
Figure 5C:
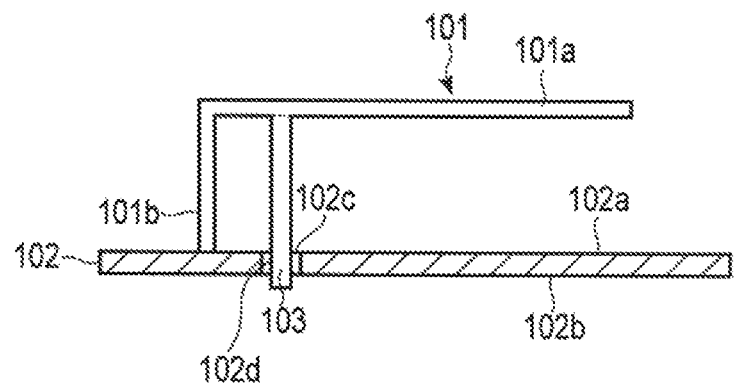

Next, a configuration of the radiation elements 101 will be described with reference to FIG. 5A to FIG. 5C. FIG. 5A to FIG. 5C are diagrams showing a structure of one radiation element 101 of the antenna apparatus 100 fixed on the first plate surface 102a of the substrate 102. FIG. 5A is a perspective view of one radiation element 101. FIG. 5B is a plan view of the one radiation element 101. FIG. 5C is a sectional view of the one radiation element 101 taken along the line VC-VC in FIG. 5B.

One radiation element 101 includes a plate shape conductor bent into a parallel portion 101a in parallel with the substrate 102 and a bent portion 101b connected to the ground layer of the first plate surface 102a. Furthermore, on the parallel portion 101a, a power supply line 103 extends downward in FIG. 5A at a position separated by a fixed distance from a position of the bent portion 101b. This structure of one radiation element 101 is referred to as an inverted F antenna.

The radiation element 101 includes a portion 102c, which is proximate to the power supply line 103, on the first plate surface 102a of the substrate 102. In the portion 102c, a part of the ground layer, for example, copper foil, is peeled and an insulation layer, such as resin and ceramic, is exposed. A through hole 102d is provided in the portion 102c, and the power supply line 103 passes through the through hole 102d. The power supply line 103 passes through the substrate 102 without being connected to the ground layer of the first plate surface 102a. Accordingly, the power supply line 103 is connected to the power supply unit, including a power supply pattern such as a micro-strip line, on the second plate surface 102b. The power supply unit may have a connector for connecting to the wireless tag communication device 200 via a coaxial cable and the connector may distribute electricity to each power supply line 103. In addition, each power supply line 103 may have a connector for connecting to a coaxial cable. Consequently, electricity is supplied from the power supply unit to the radiation elements 101 through the power supply line 103, and radio waves are radiated by the radiation elements 101, excited by the supplied electricity.

FIG. 2 is a sectional view showing an assembled state of the antenna apparatus 100 and the optical reader 400 according to the first embodiment. For example, the optical reader 400 is fixed by a plurality of fixing means, such as a bolt 404 and a nut 405, on a fixed plate 403. In addition, a plurality of bar shape spacers 406, for example, four spacers are installed on the same surface of the fixed plate 403 as the optical reader 400. Fixing screws 407 are installed on and protrude from both upper and lower ends of each spacer 406. Specifically, a fixing screw 407 on the upper end of each spacer 406 extends through a hole on the substrate 102 and protrudes from the first plate surface 102a (the same surface of the substrate 102 as the radiation elements 101 of the antenna apparatus 100). A nut 408 is provided with the fixing screw 407, and thus the upper end of each spacer 406 is fixed to the substrate 102.

In addition, a fixing screw 407 on the lower end of each spacer 406 extends through a hole on the substrate 102 and protrudes from a lower surface of the fixed plate 403 in FIG. 2. A nut 408 is provided with the fixing screw 407, and thus the lower end of each spacer 406 is fixed to the fixed plate 403. Therefore, positions of the antenna apparatus 100 and the optical reader 400 are determined. In a supporting mechanism 410, including the spacers 406 and supporting the optical reader 400, the optical reader 400 has a light axis 401 in a direction approximately perpendicular to the substrate 102 of the antenna apparatus 100. A dual-type reader unit 411 having an antenna apparatus 100 and an optical reader 400 integrally assembled using the supporting mechanism 410 can be provided.

Here, the light axis 401 of the optical reader 400 is located at approximately the center of the opening 104 of the substrate 102. In FIG. 2, a read range 402 of the optical reader 400 gradually expands in an upward direction, as indicated by hatching. The four radiation elements 101 of the antenna apparatus 100 are installed outside a range of the read range 402 of the optical reader 400. The shape of opening 104 is not limited to a rectangle (rectangular shape), but may be other shapes such as circular or asymmetrical.

Next, the conductive member 105 will be described. In the embodiment, the conductive member 105 is a stack of transparent conductive films (for example, indium tin oxide (ITO) film or silver nanowire film), through which light passes, in a rectangular frame shape. As described in FIG. 3 and FIG. 4, the conductive member 105 is disposed so as to cover the entire circumferential edge (perimeter) portion of the opening 104, and is electrically connected to the ground layer of the first plate surface 102a by, for example, solder or a conductive tape. The conductive member 105 may be disposed so as to cover a part of the opening 104. In addition, the conductive member 105 may be connected to the ground layer of the second plate surface 102b electrically connected to the ground layer of the first plate surface 102a by a through-hole, via or the like.

Next, operations and effects of the antenna apparatus 100 will be described. In the antenna apparatus 100, the conductive member 105 is disposed so as to cover the entire circumferential edge portion of the opening 104 of the substrate 102. Thus, it is possible to suppress radiation of radio waves to the backside of the antenna apparatus 100.

FIGS. 6A and 6B are results obtained by comparing the antenna apparatus 100 of the embodiment (with the conductive member 105 provided so as to cover the entire circumferential edge portion of the opening 104 of the substrate 102) and another antenna apparatus lacking a conductive member 105 attached to the substrate 102. Here, FIG. 6A is a characteristic diagram showing directivity calculated by electromagnetic field simulation. A characteristic curve d1 of a solid line in FIG. 6A is data of the antenna apparatus 100 of the embodiment (with conductive member 105), and a characteristic curve d2 of a dotted line is data of the other antenna apparatus (without conductive member 105).

In addition, FIG. 6B shows an FB ratio (ratio of directivity gain in 0° direction and 180° direction). Here, the FB ratio is 8.86 dB in the antenna apparatus 100 of the embodiment (with conductive member 105), and the FB ratio is 5.35 dB in the other antenna apparatus (without conductive member 105).

In the antenna apparatus 100, by disposing the conductive member 105 so as to cover the entire circumferential edge portion of the opening 104 of the substrate 102, it is possible to suppress radiation of radio waves to backside direction (180° direction) of the antenna apparatus 100 according to increase of the FB ratio as described in FIGS. 6A and 6B. Therefore, even in a case where the optical reader 400 (or a mounting or the like for affixing the optical reader 400) is disposed in the backside of the antenna apparatus 100, it will be less susceptible to these influences, and it is possible to prevent the antenna characteristics from changing. As a result, it is possible to provide the antenna apparatus for a wireless tag communication device in which the radiation of radio wave to backside of the antenna apparatus 100 is suppressed without hindering light passing through to the optical reader 400 or the like.

In the embodiment, as described in FIGS. 3 and 4, the antenna apparatus 100 in which four elements of radiation elements 101 are disposed is described. However, the number of the radiation elements may be between one and three or equal to or greater than five.

Furthermore, in the embodiment, approximately the entire region of the first plate surface 102a of the substrate 102 is the ground layer. However, the conductive member 105 may be attached to approximately the entire region of the first plate surface 102a of the substrate 102 as a ground layer, without providing a conductive layer on the first plate surface 102a.

Figure 7:
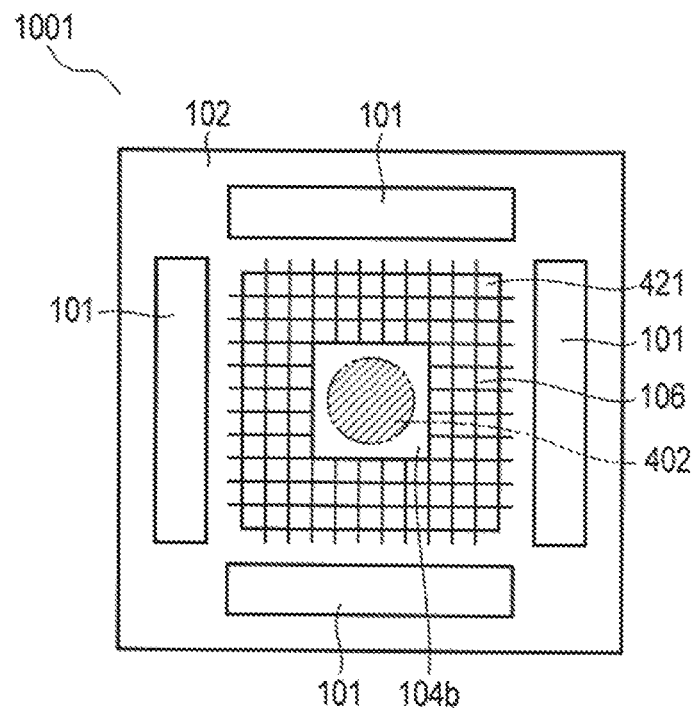
FIG. 7 is a plan view of an antenna apparatus using a lattice shape conductor in a conductive member according to a second embodiment.

FIG. 7 shows a second embodiment. The second embodiment is a modification example in which the configuration of the antenna apparatus 100 of the first embodiment (see FIG. 1 to FIG. 6) is changed as follows. An antenna apparatus 1001 of the second embodiment uses a lattice-shaped conductor (conductive mesh) 421 instead of the conductive member 105 of the first embodiment.

In the second embodiment, an approximately rectangular opening 104b that has an opening area smaller than that of the opening 104 of the first embodiment is provided approximately at the center of the substrate 102. The opening area of the opening 104b is greater than at least the reading range 402 of the optical reader 400.

The lattice-shaped conductor 421 is disposed so as to cover the entire circumferential edge portion of the opening 104b on the substrate 102. Thus, the lattice-shaped conductor 421 has a shape which does not block the reading range 402. The lattice-shaped conductor 421 is electrically connected to the ground layer of the first plate surface 102a by solder. Accordingly, the antenna apparatus 1001 of the second embodiment does not hinder the reading of code symbol 500 by the optical reader 400.

Figure 8:
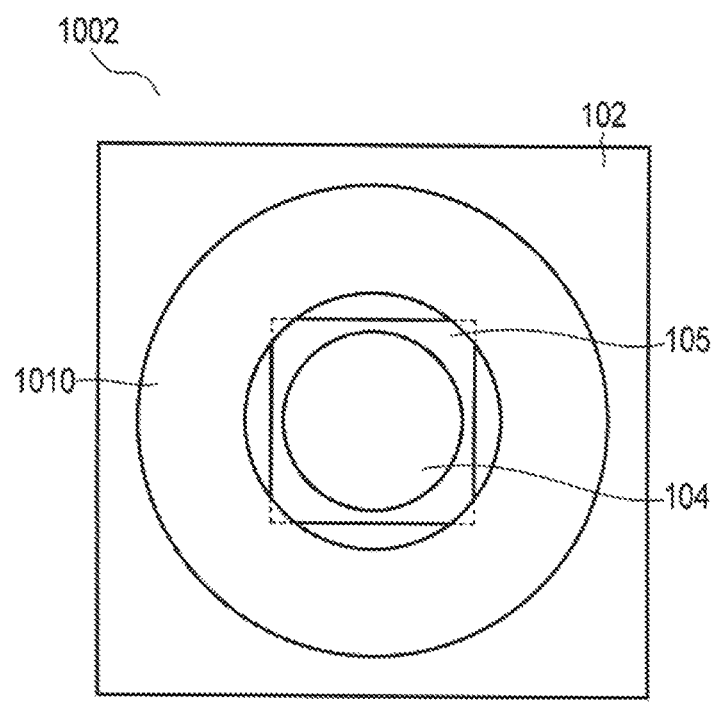
FIG. 8 is a plan view of an antenna apparatus using a ring shape conductor in a radiation element according to a third embodiment.

FIG. 8 shows a third embodiment. The third embodiment is another modification example in which the configuration of the antenna apparatus 100 of the first embodiment (see FIG. 1 to FIG. 6) is changed as follows. In an antenna apparatus 1002 of the third embodiment, a radiation element 1010 is a ring-shaped conductor, and the radiation element 1010 replaces the four radiation elements 101 of the inverted F antenna structure of the first embodiment. The radiation element 1010 has an opening greater than the opening 104 of the substrate 102. Also, in the third embodiment, the conductive member 105 is disposed so as to cover the entire circumferential edge portion of the opening 104 on the substrate 102. Thus, it is possible to suppress the radiation of radio waves to the backside of the antenna apparatus 1002.

According to these various embodiments, it is possible to provide an antenna apparatus for a wireless tag communication device for which the radiation of radio waves in a backward direction is suppressed without hindering light needed for reading by an optical reader or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An antenna apparatus disposed above an optical reader, comprising:
   a ground plate having an opening therein;
   a ground layer on a first side of the ground plate;
   an antenna on the first side of the ground plate and connected to the ground layer, the antenna being disposed around the opening; and
   a conductive member on the first side of the ground plate, wherein
   the conductive member is electrically connected to the ground layer and covers an entire outer perimeter of the opening so as not to substantially block light that is emitted from the optical reader, which is disposed on a second side of the ground plate opposite to the first side, and passes through the opening.

2. The antenna apparatus according to claim 1, wherein the conductive member is a stack of transparent conductive films and has a frame shape corresponding to the opening.

3. The antenna apparatus according to claim 1, wherein the conductive member is a conductive lattice.

4. The antenna apparatus according to claim 1, wherein the antenna comprises a plurality of radiation elements.

5. The antenna apparatus according to claim 4, wherein each radiation element comprises:
   a plate shape conductor bent into a first portion parallel to the ground plate and a bent portion connecting the ground layer to the first portion, and
   a power supply line spaced from the bent portion along a direction parallel to ground plate, the power supply line passing through the ground plate without electrically contacting the ground layer.

6. The antenna apparatus according to claim 1, wherein the antenna is a ring-shaped element.

7. The antenna apparatus according to claim 6, wherein the opening is circular and has a first diameter, and
   the antenna has inner ring diameter that is greater than the first diameter.

8. A dual-type reader apparatus, comprising:
   an optical reader for reading code symbols; and
   an antenna apparatus for communicating with wireless tags and comprising:
   a ground plate having an opening therein;
   an antenna on a first side of the ground plate; and a conductive member on the first side of the ground plate, wherein the conductive member is electrically connected to the ground layer and covers an entire outer perimeter of the opening so as not to substantially block light that is emitted from the optical reader, which is disposed on a second side of the ground plate opposite to the first side, and passes through the opening.

9. The dual-type reader apparatus according to claim 8, further comprising:

a support structure to which the optical reader is attached; and a plurality of spacers connecting the ground plate and the support structure, wherein the optical reader is positioned on the support structure such that light emitted from the optical reader passes through the opening.

10. The dual-type reader apparatus according to claim 8, wherein the conductive member is a stack of transparent conductive films and has a frame shape corresponding to the opening.

11. The dual-type reader apparatus according to claim 8, wherein the conductive member is a conductive lattice.

12. The dual-type reader apparatus according to claim 8, wherein the antenna comprises a plurality of radiation elements.

13. The dual-type reader apparatus according to claim 12, wherein each radiation element comprises:

a plate shape conductor bent into a first portion parallel to the ground plate and a bent portion connecting the ground layer to the first portion, and a power supply line spaced from the bent portion along a direction parallel to ground plate, the power supply line passing through the ground plate without electrically contacting the ground layer.

14. The dual-type reader apparatus according to claim 8, wherein the antenna is a ring-shaped element.

15. The dual-type reader apparatus according to claim 14, wherein the opening is circular and has a first diameter, and the antenna has inner ring diameter that is greater than the first diameter.

16. A reader apparatus, comprising:

a wireless tag reader for reading information from a wireless tag attached to an item;

an optical reader for reading code symbols attached to an item; and a controller receiving information from the wireless tag reader and the optical reader and configured to start and stop operations of wireless tag reader and the optical reader, wherein the wireless tag reader includes:

a ground plate having an opening therein;

a ground layer on a first side of the ground plate;

an antenna on the first side of the ground plate and connected to the ground layer, the antenna being disposed around the opening; and a conductive member on the first side of the ground plate, wherein the conductive member is electrically connected to the ground layer and covers an entire outer perimeter of the opening so as not to substantially block light that is emitted from the optical reader, which is disposed on a second side of the ground plate opposite to the first side, and passes through the opening.

17. The reader apparatus according to claim 16, wherein the wireless tag is a RFID tag.

18. The reader apparatus according to claim 16, wherein the code symbols are QR-type codes.

* * * * *